United States Patent
Su

(10) Patent No.: US 6,736,608 B2
(45) Date of Patent: May 18, 2004

(54) HEAT-DISSIPATING FAN WITH MANUALLY ADJUSTABLE SPEED-SETTING

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 0 days.

(21) Appl. No.: 10/197,852

(22) Filed: Jul. 19, 2002

(65) Prior Publication Data

US 2004/0001764 A1 Jan. 1, 2004

(30) Foreign Application Priority Data

Jul. 1, 2002 (TW) ........................ 91209894 U

(51) Int. Cl.[7] .................. F04B 17/00; H05K 7/20
(52) U.S. Cl. ................ 417/326; 417/423.14; 361/695
(58) Field of Search .............. 417/326, 423.14, 417/44.1, 14; 361/687, 695

(56) References Cited

U.S. PATENT DOCUMENTS

| | | | | |
|---|---|---|---|---|
| 4,767,262 A | * | 8/1988 | Simon | ............ 415/119 |
| 5,636,103 A | * | 6/1997 | Bushner | ............ 361/695 |
| 5,926,386 A | * | 7/1999 | Ott et al. | ............ 700/70 |
| 5,988,995 A | * | 11/1999 | Hong | ............ 417/423.14 |
| 6,396,675 B1 | * | 5/2002 | Su | ............ 361/103 |

\* cited by examiner

*Primary Examiner*—Justine R. Yu
*Assistant Examiner*—Timothy P. Solak
(74) *Attorney, Agent, or Firm*—Troxell Law Office PLLC

(57) ABSTRACT

The present invention provides a heat-dissipating fan with a manually adjustable speed-setting function by locating a speed-adjusting revolving-button or push-button in one of the bolt-holes of the front side or rear side of said heat-dissipating fan. The size, and structure of the regular original heat-dissipating fan is therefore unchanged and a speed-adjusting revolving-button or push-button is provided in a selected bolt-hole for users to set the speed of the fan directly according to needs at any time. Additionally, a temperature-detecting thermal resistor is included to achieve 2-fold speed-adjusting.

4 Claims, 4 Drawing Sheets

1

HEAT-DISSIPATING FAN WITH MANUALLY ADJUSTABLE SPEED-SETTING

BACKGROUND OF THE INVENTION

Due to the fast development of electronic technology in the recent years, the equipments from daily utilities to the commercials and industrials use electronic technology without exception. Obviously, electronic products are related to electricity, and the equipment generates heat. Especially the higher the efficiency, the faster the execution speed of the equipment, the more the problems of temperature over-heat. Improper over-heat in the equipment readily damages the equipment or their elements such as "personal computer" products are the best example.

At present, in most of the equipments that generate heat, the most efficient and most general method to over-come over-heat is the supplement of heat-dissipating fans in working environment in the equipment or on the specific elements readily generate heat, which, except the temperature of said equipments being properly controlled, achieving proper convection to the entire equipment or system, gaining proper temperature control in the interior of the equipment, accordingly prevent crash or damage resulting from improper over-heat, even accidental fire.

The speed of conventional independent heat-dissipating fan, RPM, is set-up by the factory in production. Usually, users cannot set-up or adjust its speed individually, unless an adjuster-button is added in order to change or adjust the speed of said heat-dissipating fan. The most generally used rectangle frame-body heat-dissipating fan, provides at the 4 corners of the frame-body, 2 to 4 perforated bolt-hole positions, for the heat-dissipating fan to be fixed at the needed position by bolts.

The present invention made good use of the original bolt-holes of said heat-dissipating fan, provided a speed-adjusting revolving-button or switch in any of the bolt-holes, under the principle without changing or destroying the size, method of use, method of fixation, and the structure of the original heat-dissipating fan. In one of the bolt-holes in the corners of the front or rear side of said heat-dissipating fan, a speed-adjusting revolving-button or push button is installed for user to manually adjust or set-up the speed of said heat-dissipating fan directly according to needs individually.

At present, some of the heat-dissipating fan are added with temperature-detecting and automatic speed-adjusting thermal resistor, to show low-speed revolution when entering sleeping state or show high-speed revolution with increased heat dissipation when temperature is elevated, the working principle is providing a thermal resistor at the power supply end of the heat-dissipating fan, slowing or accelerating the revolution of said fan by the change of resistance value. The content of the present invention further adapts with the original temperature-detecting thermal resistor, to achieve a 2-fold function of speed-adjustment. The detailed structure and embodiment of the present invention will be described as following adapting with the appended drawings.

SUMMARY OF THE INVENTION

The present invention provides a heat-dissipating fan with manually adjustable speed-setting switch, particularly referring to using one of the bolt-holes of the front side or rear side of said heat-dissipating fan without changing the size, and structure of the regular original heat-dissipating fan and providing a speed-adjusting revolving-button or push-button at that bolt-hole, for users to set the speed of the fan directly according to needs any time, and adapting with the original temperature-detecting thermal resistor to achieve, 2-fold, speed-adjusting.

DETAILED DESCRIPTION OF THE EMBODIMENT AND STRUCTURE

Figure 1:
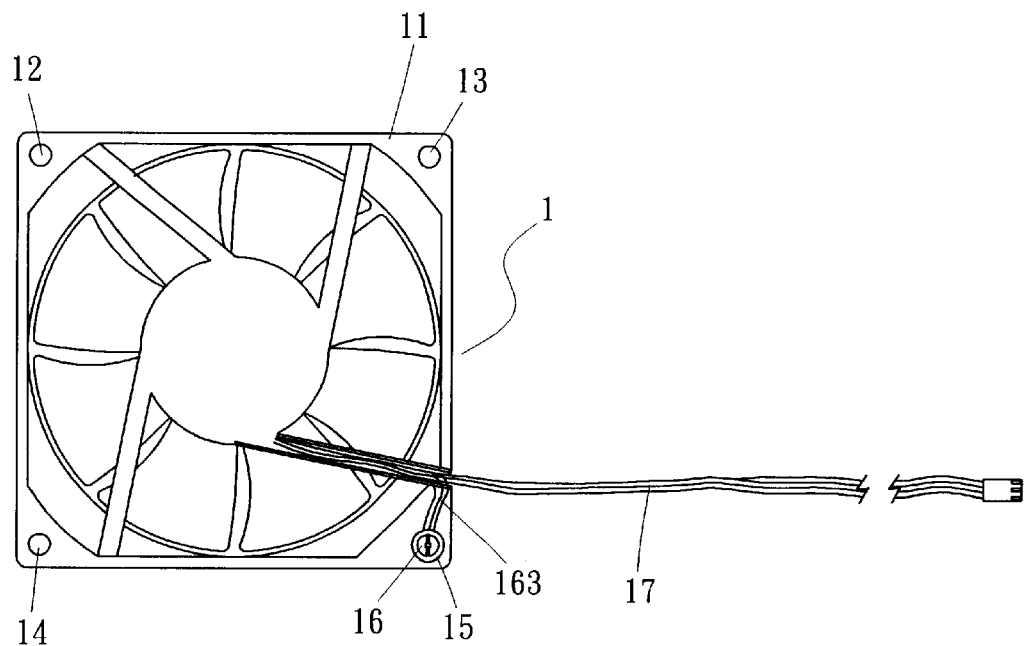
FIG. 1 is the front view of the simplified model of the present invention with manual adjustment for setting-up of speed of the heat-dissipating fan.

As shown in FIG. 1, the present embodiment uses one of the bolt-holes 12, 13, 14, 15, at the front side and rear side corners of the frame body 11 of the heat-dissipating fan 1, to install a speed-adjuster-button or switch 16 with a rear end 161 of the button or switch 16 installed and fixed in the above-mentioned bolt-hole 15. A revolving handle or push-button 162 of the button or switch extends outside of the frame body 11. Further, a power cord 163 of the speed-adjuster-button or switch 16 is connected to a power cord 17 of the fan 1. Accordingly, said heat-dissipating fan 1, without change or destruction of the original size, method of use, way of fixation and principle of structure, provides the user to set-up the speed of said heat-dissipating fan individually according to needs directly any time.

Figure 2:
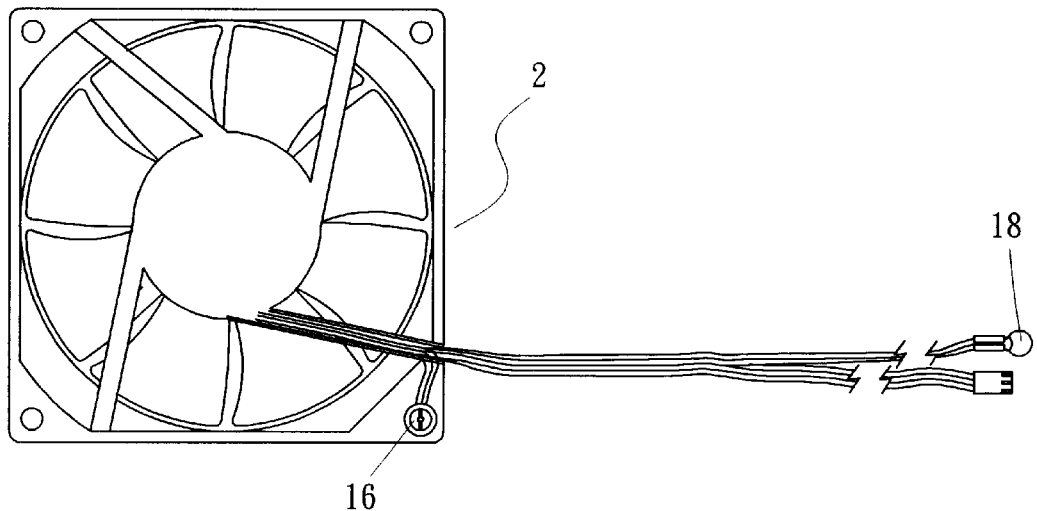
FIG. 2 is the front view of present invention used in heat-dissipating fan with thermal resistor manually adjustable for speed set-up.

As shown in FIG. 2, the present invention includes a heat-dissipating fan 1 with the speed-adjuster-button or switch 16 being installed in the same manner on a thermal resistor heat-dissipating fan 2 and a thermal resistor 18, to achieve a 2-fold speed-adjusting function as shown in FIG. 2.

Figures 3A, 3B:
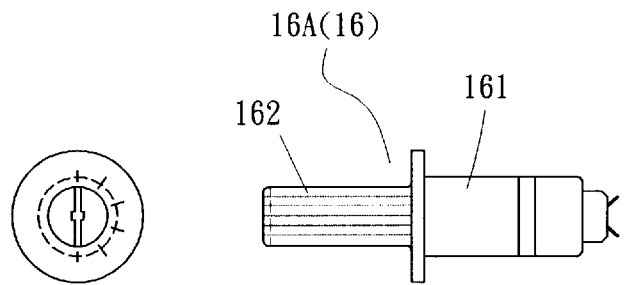
FIG. 3A is the front view of a step-wise adjuster-revolving-button in the present invention in heat-dissipating fan with manually adjustable setting-up for speed.
FIG. 3B is the lateral view of a step-wise adjuster-revolving-button in the present invention in heat-dissipating fan with manually adjustable setting-up for speed.
Figures 4A, 4B:
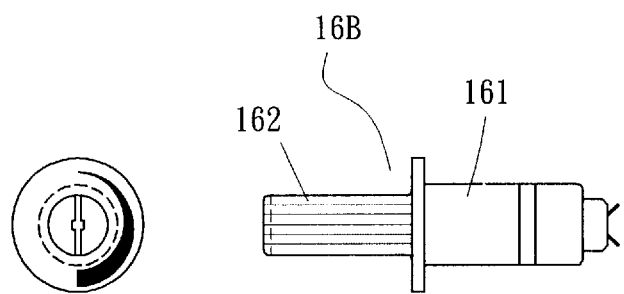
FIG. 4A is the front view of a step-less adjuster-revolving-button in the present invention in heat-dissipating fan with manually adjustable setting-up for speed.
FIG. 4B is the lateral view of a step-less adjuster-revolving-button in the present invention in heat-dissipating fan with manually adjustable setting-up for speed.
Figures 5A, 5B:
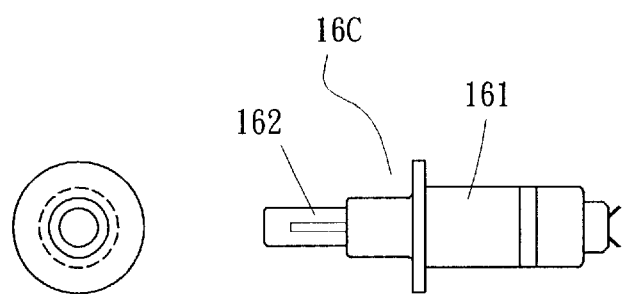
FIG. 5A is the front view of a push-button adjuster-switch in the present invention in heat-dissipating fan with manually adjustable setting-up for speed.
FIG. 5B is the lateral view of a push-button adjuster-switch in the present invention in heat-dissipating fan with manually adjustable setting-up for speed.

The speed-adjuster-button or switch 16 used by the above-mentioned of the present invention includes a step-wise adjuster-button 16A as shown in FIGS. 3A and 3B, a step-less adjuster-button 16B as shown in FIGS. 4A and 4B, or a push-button adjuster-button 16C as shown in FIGS. 5A and 5B.

As described above, the invention, under the principle of without changing or destroying the size, method of use, method of fixation and structure of the original fan 1, after addition of a adjuster-button or switch 16 of various types, can provide the user with manual set-up of the speed of said heat-dissipating fan 1 directly according to needs any time, obviously which improves the efficacy without fear.

Upon implementing the present invention of the device of a heat-dissipating fan 1, the device can be installed anywhere in need of heat-dissipation, which if fixed on a case or in a closed interior space, can be manually set-up or adjusted before installed and bolted fast.

Figure 6:
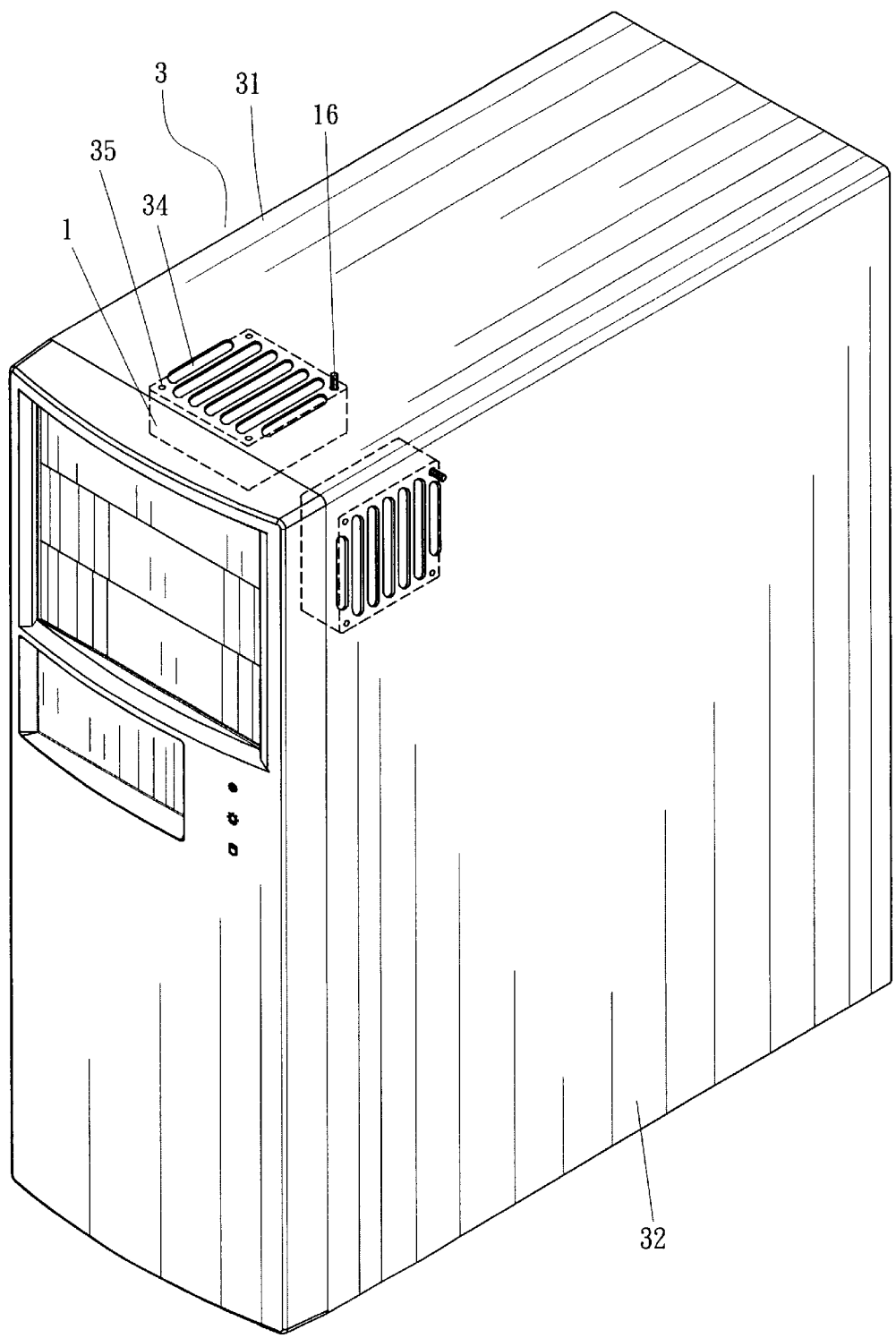
FIG. 6 is the perspective view of an embodiment of the present invention, a heat-dissipating fan with manually adjustable setting-up for speed used in personal computer.
Figure 7:
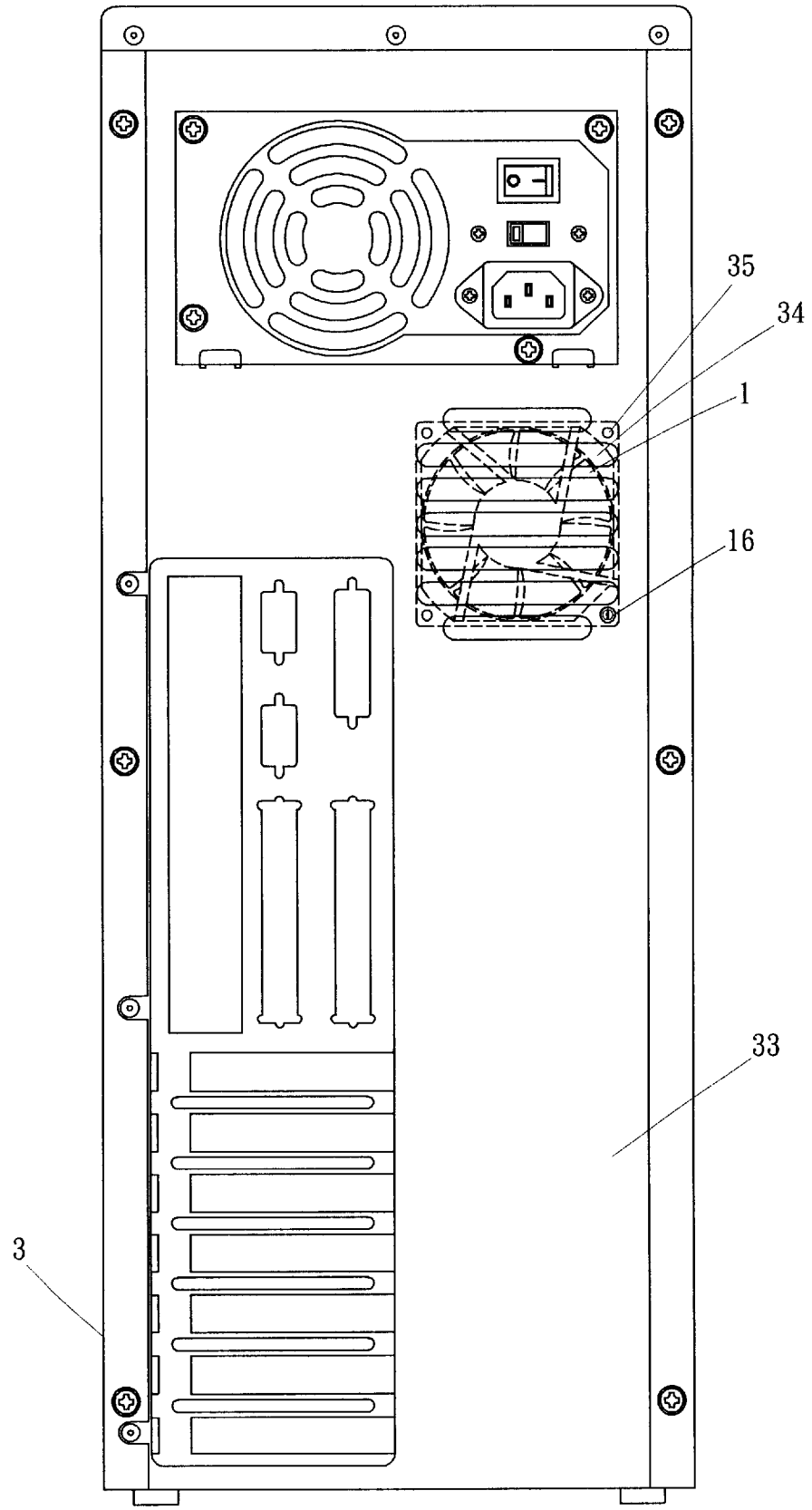
FIG. 7 is the rear view of an embodiment of the present invention, a heat-dissipating fan with manually adjustable setting-up for speed used in computer personal.

As shown in FIGS. 6 and 7 the perspective view of the embodiment, the manually adjustable speed-setup fan 1 is installed in a shell-case body 3 of a computer having a reserving heat-dissipating hole 34, and fan-fixation holes 35 in a selected position on the upward surface 31, lateral surface 32, or rear surface 33 of the case body 3. The manually adjustable speed-setup heat-dissipating fan 1 is fixed inside the heat-dissipating hole 34, and the speed-adjusting handle or switch 16 extends one of the fixation holes 35 to provide the user with a switch for adjusting the speed of the heat-dissipating fan 1 directly with fingers from outside the case body 3. Accordingly, to greatly improve the efficacy of the invention.

What is claimed is:

1. A heat-dissipating fan with a manually adjustable speed set-up comprising:
   a) a frame body of the heat dissipating fan having a plurality of mounting bolt holes for mounting the frame body on a device; and
   b) a speed adjustment button located in and protruding from one of the plurality of mounting bolt holes, the speed adjustment button being electrically connected to and adjustably controlling a speed of the heat dissipating fan.

2. The heat-dissipating fan according to claim 1, further comprising a thermal resistor electrically connected to the heat dissipating fan, wherein the heat dissipating fan includes a 2-fold speed adjusting function.

3. The heat-dissipating fan according to claim 1, wherein the speed adjustment button is selected from a group of adjustable buttons consisting of a step-wise adjuster-button, a step-less adjuster-button, and a push-button adjuster-button.

4. The heat-dissipating fan according to claim 1, wherein the speed adjustment button extends through one of a plurality of fan-fixation holes in a shell-case body of a computer when the heat-dissipating fan is connected to a heat dissipating hole of the shell-case body, such that the speed adjustment button is accessible from an exterior of the shell-case body to selectively control the speed of the heat-dissipating fan.

* * * * *